(12) United States Patent
Lee et al.

(10) Patent No.: US 7,148,586 B2
(45) Date of Patent: Dec. 12, 2006

(54) SINE WAVE GENERATION CIRCUIT AND UNINTERRUPTIBLE POWER SUPPLY SYSTEM USING THE SAME

(75) Inventors: Dong-Hyang Lee, Incheon (KR); Yeung-Soo Lee, Incheon (KR)

(73) Assignee: World Top Technology Co., Ltd., Pucheon-Si (KR)

( * ) Notice: Subject to any disclaimer, the term of this patent is extended or adjusted under 35 U.S.C. 154(b) by 480 days.

(21) Appl. No.: 10/688,594

(22) Filed: Oct. 17, 2003

(65) Prior Publication Data

US 2004/0084968 A1  May 6, 2004

(30) Foreign Application Priority Data

Oct. 24, 2002  (KR)  .................... 10-2002-0065311

(51) Int. Cl.
*H02J 7/00* (2006.01)
*H02J 9/00* (2006.01)
*H03F 3/217* (2006.01)

(52) U.S. Cl. ........................... 307/65; 307/66; 330/251
(58) Field of Classification Search ................ 307/65, 307/66; 330/251
See application file for complete search history.

(56) References Cited

U.S. PATENT DOCUMENTS 6,175,311 B1 *  1/2001  Li ............................. 340/657

| | | | |
|---|---|---|---|
| 6,385,056 B1 * | 5/2002 | Gucyski | 363/15 |
| 2002/0175750 A1 * | 11/2002 | Kim | 330/10 |
| 2003/0048006 A1 * | 3/2003 | Shelter et al. | 307/64 |

* cited by examiner

*Primary Examiner*—Lynn Feild
*Assistant Examiner*—Michael Rutland-Wallis
(74) *Attorney, Agent, or Firm*—Cantor Colburn LLP

(57) ABSTRACT

A sine wave generation circuit and an uninterruptible power supply system (UPS) using the same, and more particularly, a sine wave generation circuit and a UPS using the same, which can output a sine wave for direct current (DC) power from a battery. In the UPS, a rectifier rectifies commercial alternating current (AC) power from an input terminal and converts the AC power into DC power. A charger charges a battery with the DC power. The battery provides the DC power. A DC-DC converter boosts and/or drops the DC power inputted from the battery by a predetermined level of the AC power. A D-class amplifier receives the DC power from the DC-DC converter and outputs a sine waveform power signal in response to a waveform control signal. A sine waveform controller controls a sine waveform generation operation of the D-class amplifier. A switching unit switches the commercial AC power from the input terminal to a load in a normal mode, and switches the sine waveform power signal from the D-class amplifier to the load when an error of the commercial AC power is detected.

3 Claims, 7 Drawing Sheets

SINE WAVE GENERATION CIRCUIT AND UNINTERRUPTIBLE POWER SUPPLY SYSTEM USING THE SAME

BACKGROUND OF THE INVENTION

1. Field of the Invention

The present invention relates to a sine wave generation circuit and an uninterruptible power supply system (UPS) using the same, and more particularly to a sine wave generation circuit and an uninterruptible power supply system (UPS) using the same, which can output a sine wave for direct current (DC) power stored in a battery.

2. Description of the Related Art

All electronic products using commercial power receive sine waves in order to operate normally. Where an electronic product is implemented as a mobile electronic product or backup equipment, electric power corresponding to the commercial power must be provided to the electronic product. Mobile electronic products using commercial alternating current (AC) power include commercial laser and light equipment (100 W–500 W), measurement equipment (100 W–1 KW) installed in a special vehicle for performing various inspections, a bus-dedicated television or refrigerator (100 W–1 KW), etc. Furthermore, the backup equipment includes an uninterruptible power supply system (UPS) (500 W–3 KW), a frequency converter (500 W–1 KW), a solar-cell power converter (1 KW–5 KW), etc.

As described above, the mobile electronic product and backup equipment using the commercial AC power are commonly equipped with a battery, convert direct current (DC) power stored in the battery into the commercial AC power, and provide the commercial AC power to a load (or a main body of an electronic product).

However, an inverter (e.g., an AC-DC converter) provided in the mobile electronic product mostly outputs a modified square wave. Thus, the inverter can cause a serious damage to an electronic product equipped with a motor. In addition, the inverter is large and heavy.

Since a converter (e.g., a DC-DC converter) or inverter for use in the backup equipment uses an inductance and capacitance (LC) resonant circuit to generate an AC wave, the efficiency of the converter or inverter is very low. Furthermore, since the converter or inverter for use in the backup equipment is large and heavy, its mobility is limited and its price is high.

On the other hand, an accident due to a power failure frequently occurs recently in comparison with the past. The amount of damage due to the power failure at the present is more considerable in comparison with that at the past. The UPS is a system for supplying high-quality electric power to prevent an outage or malfunction of a facility due to a sudden power supply failure associated with an instantaneous power failure or an instantaneous voltage or frequency variation in highly advanced computers, plant monitoring control devices, communication equipment, plant process control devices, and major equipment for use in a hospital, etc. The UPS provides electric power during a power outage using a battery to prevent damage due to the above-described power failure, to prevent an undesired outage of industrial machines, and to eliminate the inconvenience in using the Internet and in daily life.

According to a structure of the UPS, the UPS includes a mechanical UPS and an electronic UPS. The mechanical UPS stores electric energy when electric power is supplied normally, rotates a motor with DC voltage stored in the battery at the time of a power failure, drives a generator with the rotating force, and produces commercial AC voltage. The electronic UPS consecutively converts the battery's voltage in a predetermined period to produce AC voltage.

In the case of the mechanical UPS, a waveform of the AC voltage must be identical to that of the commercial AC voltage. When a device receiving electric power is an inductive load, a motor brush can be damaged due to ark generation where the AC power supply cannot maintain a 60 Hz sine wave. If voltage induced through a transformer is inappropriately increased, a load device can be damaged. Furthermore, since the mechanical UPS is large and heavy and its efficiency is low, it is difficult for the mechanical UPS to be used in small-sized equipment or indoors.

In the case of the electronic UPS, its circuitry is complex. The electronic UPS is expensive and frequently failed because it must drive the circuit at a high speed. Accordingly, an improved method used by most UPSs cheaply produces a square wave, produces AC power (based on the square wave) through a linear transformer, removes values of starting and end points of the square wave using an inductance and capacitance (LC) resonant circuit, etc., and produces and uses a wave similar to a sine wave. Since this improved method cannot produce a true AC wave, a motor can be seriously damaged. The above-described electronic UPS has low efficiency and is large and heavy. Furthermore, the conventional UPSs cannot be applied to mobile products.

The conventional UPSs have been fixed in the past. However, the UPSs need to be carried to various locations since the electric power is used not only in industrial machines but also in daily life. To do this, the UPSs must be lightened in weight and slimmed in size. Of course, the UPSs must functionally supply a 60 Hz sine wave as in a commercial power supply.

FIG. 1 is a view illustrating an exemplary conventional uninterruptible power supply system (UPS).

A rectifying/charging unit 101 rectifies commercial alternating current (AC) power when the commercial AC power is supplied, converts the rectified commercial AC power into direct current (DC) power, and charges a battery 103 with the DC power.

An inverter 105 receives the DC power from the rectifying/charging unit 101 and the battery 103 connected to the rectifying/charging unit 101 in parallel. Furthermore, the inverter 105 generates AC power in the form of a square wave in response to a pulse width modulation (PWM) control signal from a PWM generator (not shown in FIG. 1).

A linear transformer 107 boosts a level of AC power applied from the inverter 105, and an inductance and capacitance (LC) resonant circuit 109 converts the AC power boosted by the linear transformer 107 into the form of a sine wave by removing peak values of starting and end points of a square wave.

For reference, circuits of the inverter 105 and the linear transformer 107 can be configured as shown in FIG. 7.

If the commercial AC power is appropriate, a bypass switch 111 applies the commercial AC power to a load. On the other hand, if the commercial AC power is inappropriate, auxiliary power processed by the system elements indicated by the reference numerals 101 to 109 is applied to the load.

As described in relation to FIG. 1, the conventional UPS configures a filter circuit such as an inductance and capacitance (LC) resonant circuit to generate a sine wave. The conventional UPS cannot correctly generate the sine wave. Thus, the efficiency of the conventional UPS is low. The conventional UPS is large in size and heavy in weight. Furthermore, the conventional UPS cannot be appropriately applied to a mobile product.

As the linear transformer 107 is employed when the DC power of the battery 103 is boosted, there are problems in that the efficiency of the conventional UPS is low, and the conventional UPS is large in size and heavy in weight.

On the other hand, a digital amplifier is an amplifier for digitally amplifying an analog source signal. After converting the analog source signal into a pulse width modulation (PWM) signal, the digital amplifier carries out an amplifying operation for the PWM signal. The PWM signal indicates a digital signal of one bit, and an audible signal level associated with the PWM signal is recorded as signal width. An amplifying stage for amplifying the PWM signal as a type of switch does not affect straight wave characteristics associated with a transistor. The PWM signal is filtered by a low-frequency filter, and is restored to an original analog signal. The digital amplifier or D-class amplifier restores the original analog signal using the low-frequency filter after amplifying a digital signal using the PWM amplifier.

Where the D-class amplifier is used, a desired output wave can be reproduced and outputted. Thus, where the D-class amplifier is applied to the mobile electronic product or backup equipment such as an electronic product using commercial AC power, DC power stored in the battery is converted into a waveform (or sine waveform) signal of high-quality commercial AC power, and the high-quality commercial AC power can be applied to a load.

The basic concept of the digital amplifier has been known since the 70's, but technology of the D-class amplifier was not applied to the field in the invention. The reason is that high fidelity performance of the digital amplifier can be implemented only when a digital signal processing (DSP) algorithm for converting a pulse code modulation (PCM) code into a PWM signal, technology for designing a high-speed DSP application specific integrated circuit (ASIC) operating at 100 MHz or above, and all technologies of electronic and information industrial fields for digitally switching and amplifying a low-power PWM signal to a high-power PWM signal are entirely harmonized. For this reason, no amplifier having the high fidelity performance has been commercialized up to now.

SUMMARY OF THE INVENTION

Therefore, the present invention has been made in view of the above problems, and it is one object of the present invention to provide a sine wave generation circuit and an uninterruptible power supply system (UPS) using the same, which can generate a true sine wave through a switching method for direct current (DC) power stored in a battery to apply the generated true sine wave to a load.

It is another object of the present invention to provide a sine wave generation circuit and an uninterruptible power supply system (UPS) using the same, which can have a small volume and light weight.

It is another object of the present invention to provide a sine wave generation circuit and an uninterruptible power supply system (UPS) using the same, which can directly output a true sine wave through a switching method based on a digital amplifier theory.

In accordance with one aspect of the present invention, the above and other objects can be accomplished by the provision of an uninterruptible power supply system (UPS) comprising: a rectifier for rectifying commercial alternating current (AC) power from an input terminal and converting the AC power into direct current (DC) power; a charger for charging a battery with the DC power; the battery for providing the DC power; a DC-DC converter for boosting and/or dropping the DC power inputted from the battery by a predetermined level of the AC power; a D-class amplifier for receiving the DC power from the DC-DC converter and outputting a sine waveform power signal in response to a waveform control signal; a sine waveform controller for controlling a sine waveform generation operation of the D-class amplifier; and a switching unit for switching the commercial AC power from the input terminal to a load in a normal mode, and switching the sine waveform power signal from the D-class amplifier to the load when an error of the commercial AC power is detected.

Thus, the present invention enables a correct sine waveform to be directly generated through only a control operation for the D-class amplifier having a low-speed switching period and a cheap microcomputer without use of a high-speed analog/digital (A/D) converter, a switch device, a digital signal processor (DSP) and a digital/analog (D/A) converter, such that a sine wave generation circuit for directly generating a true sine wave from DC power stored in a battery through a switching method and applying the generated true sine wave to the load and an uninterruptible power supply system (UPS) using the same can be appropriately implemented. Further, as an electronic product and backup equipment using the commercial power can be miniaturized and lightened in weight, a mobile electronic product can be implemented. Furthermore, as the true sine wave (or correct sine waveform) can be directly generated through the switching method and the generated true sine wave can be applied to the load, a product can be appropriately protected.

Preferably, the D-class amplifier may comprise a bridge circuit for power conversion. Preferably, the bridge circuit may comprise: a first inductance device (L1) for high-frequency pass arranged on a path (A-L2) between a second inductance device (L2), arranged on a path for connecting a first node (A) and a second node (B), and the first node (A); a third inductance device (L3) for high-frequency pass arranged on a path (L2-B) between the second inductance device (L2) and the second node (B); a first capacitance device (C1) including one end thereof connected to a third node (C) arranged on a path (L1-L2) between the first inductance device (L1) and the second inductance device (L2), and the other end thereof connected to a ground side; a second capacitance device (C2) including one end thereof connected to a fourth node (D) arranged on a path (L2-L3) between the second inductance device (L2) and the third inductance device (L3) and the other end thereof connected to the ground side; and two load output terminals (X and Y) connected to the first and second node (A and B) respectively. Preferably, the sine waveform controller may perform a control operation so that a difference between a turn-on time of one pair of switching devices (SW1 and SW4) provided in the D-class amplifier and a turn-on time of the other pair of the switching devices (SW2 and SW3) provided in the D-class amplifier can be generated, and an output terminal (X or Y) can output voltage of the turn-on time difference every time a predetermined switching period is shorter than a commercial AC power period. Preferably, the sine waveform controller may adjust the turn-on time difference in each switching period, and perform a control operation so that the voltage outputted through the output terminal (X or Y) corresponds to sine waveform power equal to the commercial AC power.

In the UPS, the D-class amplifier can be easily applied to a circuit for converting the DC power stored in the battery into a waveform signal of commercial AC power and applying the converted power to the load.

In accordance with another aspect of the present invention, the above and other objects can be accomplished by the provision of a sine wave generation circuit for converting a waveform of direct current (DC) power stored in a battery into a waveform of commercial alternating current (AC) power and applying the commercial AC power, comprising: a bridge circuit for sine wave generation, the bridge circuit comprising: a first switching device (SW1) for receiving the DC power; a second switching device (SW2) for receiving the DC power; a fourth switching device (SW4) connected to the first switching device (SW1) through a path (A→B) between a first node (A) and a second node (B); a third switching device (SW3) connected to the second switching device (SW2) through a path (B→A) between the second node (B) and the first node (A); a second inductance device (L2) arranged in the path (A-B) between the first node (A) and the second node (B); a first inductance device (L1) for high-frequency pass arranged in a path (A-L2) between the first node (A) and the second inductance device (L2); a third inductance device (L3) for high-frequency pass arranged in a path (L2-B) between the second inductance device (L2) and the second node (B); a first capacitance device (C1) including one end thereof connected to a third node (C) arranged on a path (L1-L2) between the first inductance device (L1) and the second inductance device (L2), and the other end thereof connected to a ground side; a second capacitance device (C2) including one end thereof connected to a fourth node (D) arranged on a path (L2-L3) between the second inductance device (L2) and the third inductance device (L3) and the other end thereof connected to the ground side; and two load output terminals (X and Y) connected to the first and second node (A and B) respectively; and a sine waveform controller for applying a sine wave generation control signal to the switching devices (SW1~SW4), and performing a control operation so that one pair of the first and fourth switching devices (SW1 and SW4) and the other pair of the second and third switching devices (SW2 and SW3) can alternately perform a turn-on/turn-off operation, wherein the sine waveform controller performs a control operation so that a difference between a turn-on time of one pair of switching devices and a turn-on time of the other pair of switching devices can be generated, and an output terminal (X or Y) can output voltage of the turn-on time difference every time a predetermined switching period is shorter than a commercial AC power period, and wherein the sine waveform controller adjusts the turn-on time difference in each switching period, and performs a control operation so that the voltage outputted through the output terminal (X or Y) corresponds to sine waveform power equal to the commercial AC power.

In the UPS, the D-class amplifier can be easily applied to a circuit for converting the DC power stored in the battery into a waveform signal of the commercial AC power and applying the converted power to the load. Furthermore, the present invention enables a correct sine waveform to be directly generated through only a control operation for a D-class amplifier having a low-speed switching period and a cheap microcomputer without use of a high-speed analog/digital (A/D) converter, a switching device, a digital signal processor (DSP) and a digital/analog (D/A) converter, such that a sine wave generation circuit for directly generating a true sine wave from DC power stored in the battery through a switching method and applying the generated true sine wave to the load and an uninterruptible power supply system (UPS) using the same can be appropriately implemented. Further, as an electronic product and backup equipment using the commercial power can be miniaturized and lightened in weight, a mobile electronic product can be implemented. Furthermore, as the true sine wave (or correct sine waveform) can be directly generated through the switching method and the generated true sine wave can be applied to the load, a product can be appropriately protected.

The sine wave generation circuit may further comprise a DC-DC converter for boosting and/or dropping the DC power inputted from the battery by a predetermined level of the AC power and inputting the boosted or dropped DC power into the bridge circuit for sine wave generation.

Since the present invention uses a switching transformation method without using a linear transformation method and an inductance and capacitance (LC) resonant circuit provided in the conventional UPS, the UPS can be miniaturized and lightened in weight where the sine wave generation circuit is applied to the UPS.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 2:
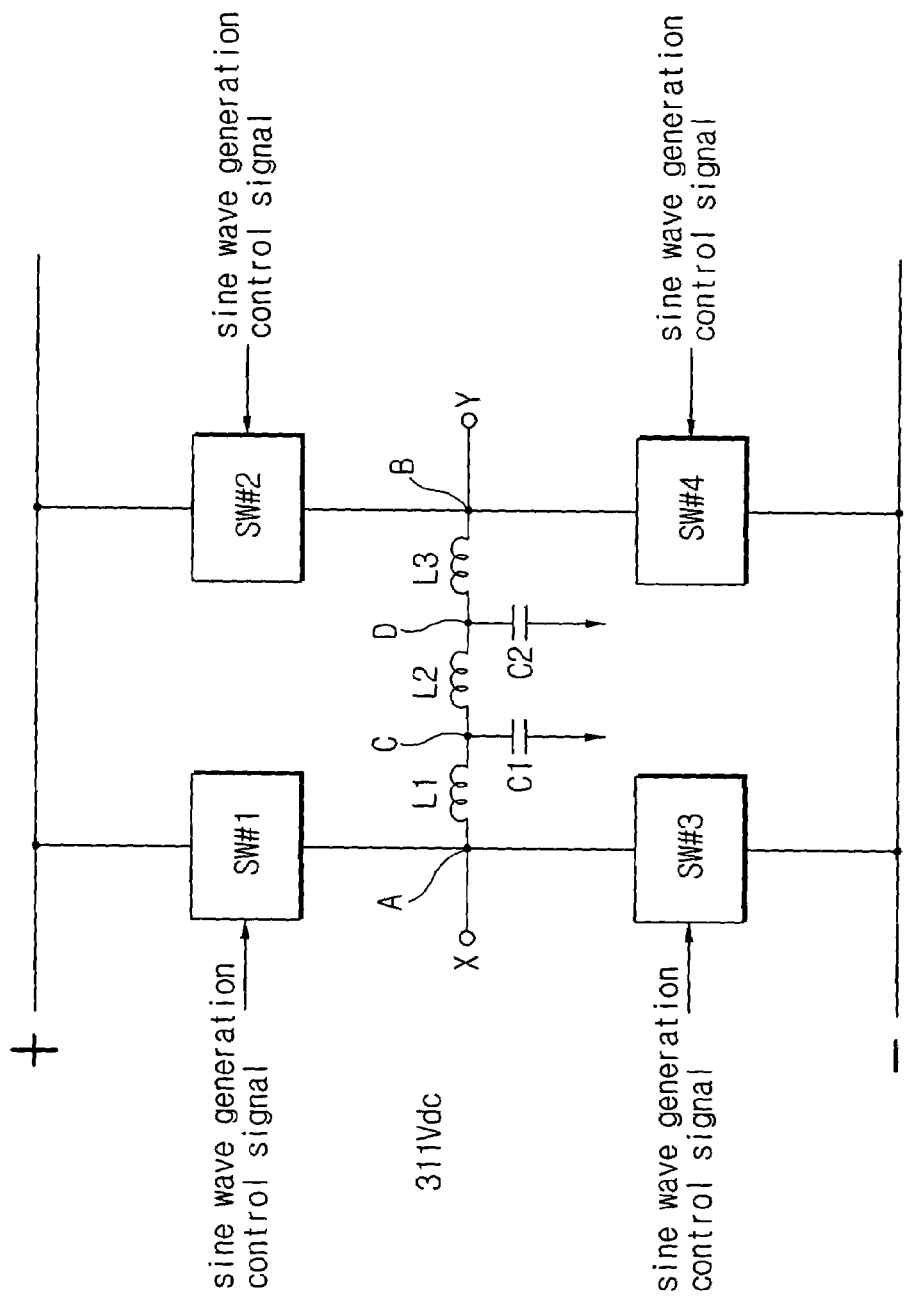
FIG. 2 is a view illustrating the configuration of a D-class amplifier in accordance with the present invention.

FIG. 2 is a view illustrating the configuration of a D-class amplifier in accordance with the present invention.

As shown in FIG. 2, the D-class amplifier of the present invention includes a first switching device SW1 for receiving direct current (DC) power stored in a battery (not shown); a second switching device SW2 for receiving the DC power; a fourth switching device SW4 connected to the first switching device SW1 through a path (A→B) between a first node A and a second node B; a third switching device SW3 connected to the second switching device SW2 through a path (B→A) between the second node B and the first node A; a second inductance device L2 arranged in the path (A-B) between the first node A and the second node B; a first inductance device L1 for high-frequency pass arranged in a path (A-L2) between the first node A and the second inductance device L2; a third inductance device L3 for high-frequency pass arranged in a path (L2-B) between the second inductance device L2 and the second node B; a first capacitance device C1 including one end thereof connected to a third node C arranged on a path (L1-L2) between the first inductance device L1 for the high-frequency pass and the second inductance device L2, and the other end thereof connected to a ground side; a second capacitance device C2 including one end thereof connected to a fourth node D arranged on a path (L2-L3) between the second inductance device L2 and the third inductance device L3 for the high-frequency pass and the other end thereof connected to the ground side; and two load output terminals X and Y connected to the first and second node (A and B) respectively.

A typical bridge circuit will now be described with reference to FIG. 2. The typical bridge circuit includes a first switching device SW1 for receiving direct current (DC) power; a second switching device SW2 for receiving the DC power; a fourth switching device SW4 connected to the first switching device SW1 through a path (A→B) between a first node A and a second node B; a third switching device SW3 connected to the second switching device SW2 through a path (B→A) between the second node B and the first node A; and a second inductance device L2 arranged in the path (A-B) between the first node A and the second node B. Operation of the bridge circuit will now be described. The switching devices SW1~SW4 receive a switching control signal, respectively, and one pair of the first and fourth switching devices SW1 and SW4 and the other pair of the second and third switching devices SW2 and SW3 alternately perform a turn-on/turn-off operation.

An output voltage value between the node A and the node B in the bridge circuit becomes zero if impedance values of the two switching device pairs SW1 and SW4 and SW2 and SW3 symmetrical to each other are the same. This bridge circuit theory was verified a long time ago.

As shown in FIG. 2, the D-class amplifier of the present invention is configured so that one pair of the first and fourth switching devices SW1 and SW4 and the other pair of the second and third switching devices SW2 and SW3 are symmetrical to each other.

A voltage distribution within the bridge circuit will now be described in the case where the first and fourth switching devices SW1 and SW4 are turned on. First, a total amount of electric current is expressed as i=311V/(ZL1+ZL2+ZL3). Where voltages of the two capacitance devices C1 and C2 arranged at both ends of the second inductance device L2 are buffered, EC1=i*(ZL2+ZL3) and EC2=i*ZL3. Furthermore, where voltages of the two capacitance devices C1 and C2 arranged at both ends of the second inductance device L2 are buffered when the second and third switching devices SW2 and SW3 are turned on, EC1=i*ZL1 and EC2=i*(ZL2+ZL1). In this case, it is assumed that a turn-on time of the first and fourth switching devices SW1 and SW4 corresponding to the path (A→B) and a turn-on time of the second and third switching devices SW2 and SW3 corresponding to the path (B→A) are the same as each other, and the above-described equations are calculations when an ideal circuit is configured.

As seen above, the same level voltage is applied to the first capacitance device C1 and the second capacitance device C2, and zero voltage due to the inverse polarity is applied to both ends of the second inductance device L2 in view of the second inductance device L2.

Figure 3:
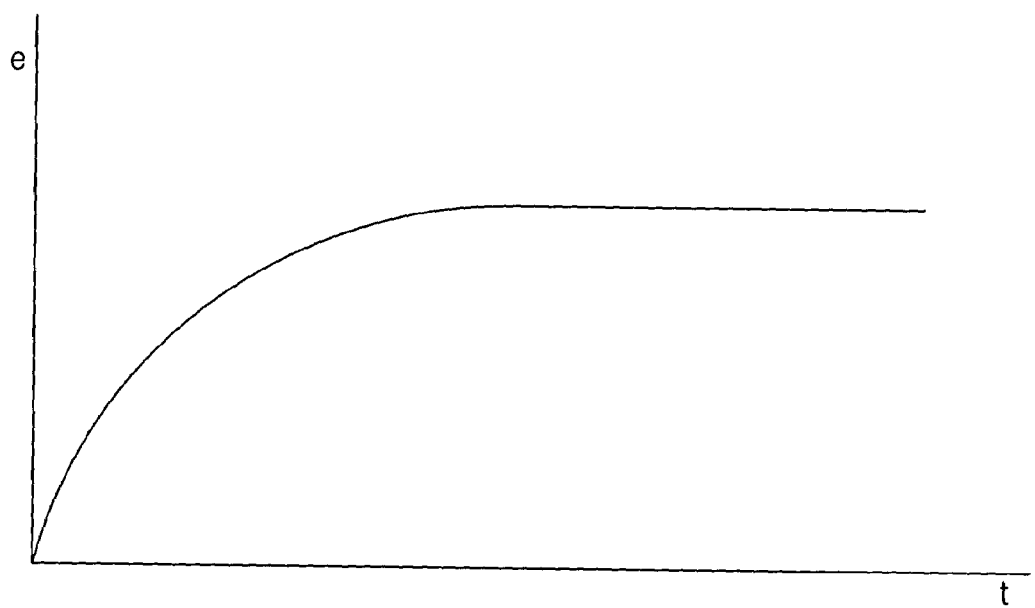
FIG. 3 is a graph illustrating the characteristics of boosted voltage across a capacitance device varying with time.

FIG. 3 is a graph illustrating the characteristics of boosted voltage across a capacitance device varying with time.

As seen in FIG. 3, voltage of the capacitance device is boosted according to time lapse. It can be seen that a charging time of the capacitance device is controlled and hence voltages at both ends of the capacitance device can be controlled.

In other words, where capacitances of the first and second capacitances C1 and C2 are the same as each other, the voltages of the capacitance devices become the same as each other, i.e., EC1=EC2, if their current on times are the same as each other. On the other hand, voltages of the capacitances become different from each other by a difference of the current on times when the current on times are different from each other. For example, the current on time of the first capacitance device C1 is longer than that of the second capacitance device C2, it is concluded that EC1>EC2. A voltage difference indicating EC1−EC2 is applied to both ends of the second capacitance device L2, i.e., the load output terminals X and Y. When charging times of the first and second capacitance devices C1 and C2 are controlled, voltage levels and polarities associated with the load output terminals X and Y can be controlled.

Operation of the above-described D-class amplifier for outputting sine waves to the load output terminals X and Y in response to a sine wave generation control signal from a sine waveform controller will be described with reference to FIGS. 4 and 5.

Figure 4:
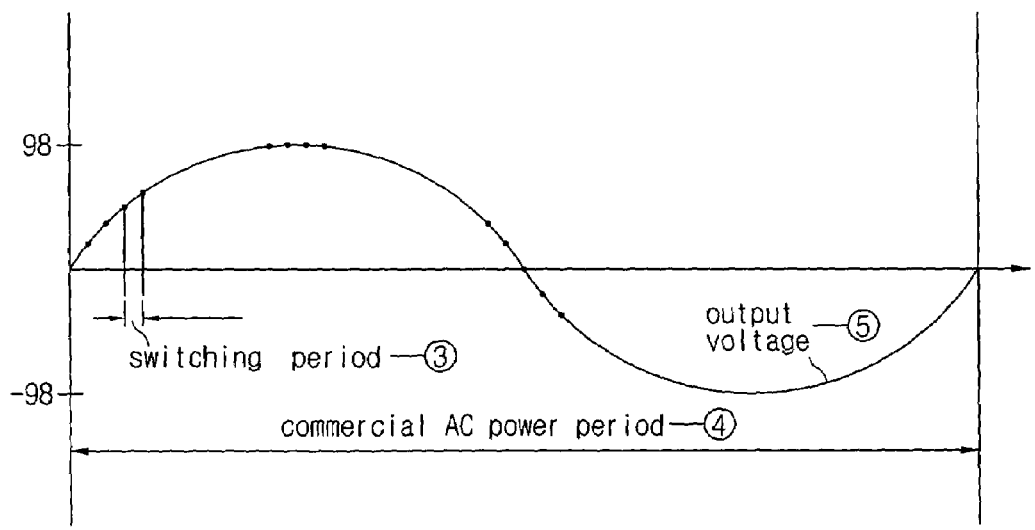
FIG. 4 is a view illustrating an operation for outputting sine wave power to a load.
Figure 5:
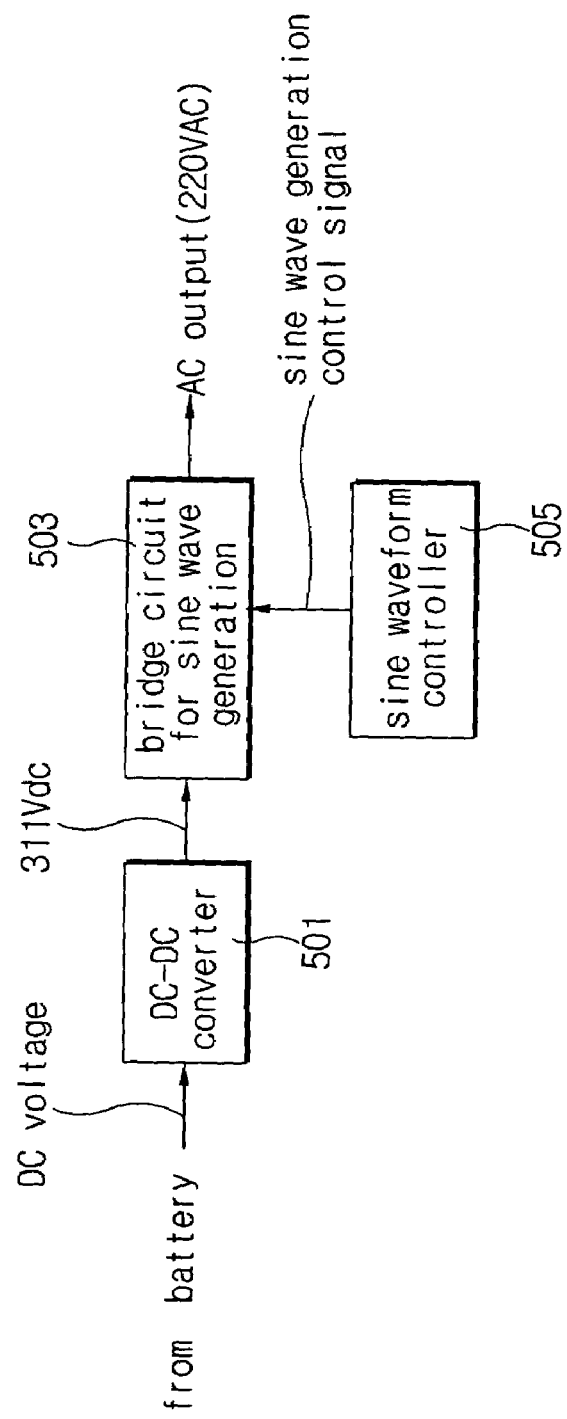
FIG. 5 is a block diagram illustrating a connection structure in the case where a sine wave generation circuit is applied to a mobile electronic product or backup equipment using commercial alternating current (AC) power.

FIG. 4 is a view illustrating an operation for outputting sine wave power to a load; and FIG. 5 is a block diagram illustrating a connection structure in the case where a circuit for generating a sine wave and applying the generated sine wave to the load is applied to a mobile electronic product or backup equipment such as a UPS using commercial alternating current (AC) power. The above-described operation and connection structure will now be described with reference to FIGS. 4 and 5 along with FIGS. 1 to 3.

A sine waveform controller 505 applies a sine wave generation control signal to the switching devices SW1~SW4, and performs a control operation so that one pair of the first and fourth switching devices SW1 and SW4 and the other pair of the second and third switching devices SW2 and SW3 can alternately perform a turn-on/turn-off operation. Every time a predetermined switching period is shorter than a commercial AC power period, the sine waveform controller 505 performs a control operation so that a difference between a turn-on time of one pair of the switching devices and a turn-on time of the other pair of the switching devices can be generated, and the output terminal X or Y can output voltage of the turn-on time difference. The sine waveform controller 505 adjusts the turn-on time difference every time the switching period, and performs a control operation so that the voltage outputted through the output terminal X or Y can be sine waveform voltage (e.g., an AC 220V output).

To output, to the load output terminal X or Y, output voltage ⑤ of a waveform equal to the commercial AC power, the sine waveform controller 505 provides, to the switching devices SW1~SW4, a sine wave generation signal for controlling a difference between a turn-on time t1 of one pair of the switching device SW1 and SW4 and a turn-on time t2 of the other pair of the switching devices SW2 and SW3 every time a switching period (e.g., 50 KHz) is shorter than a commercial AC power period (e.g., 60 Hz).

For example, when a value of the switching period is "100", a value of the turn-on time t1 is "90", and a value of the turn-on time t2 is "10", the load output terminal X or Y outputs an output voltage signal corresponding to a time difference value "80" between the value of the turn-on time t1 and the value of the turn-on time t2. On the other hand, when a value of the turn-on time t1 is "10" and a value of the turn-on time t2 is "90", the load output terminal X or Y outputs an output voltage signal corresponding to a time difference value "80". The voltage signals based on different polarities are outputted in the above-described two cases. Furthermore, when both values of the turn-on times t1 and t2 are "50", the output voltage becomes "0".

When the output voltage ⑤ is 2, 4, 6, 8, ..., 96, 98, 98, 96, ..., 4, 2, 0, −2, −4, ... as shown in FIG. 4 every time the switching period for generating one period of the commercial AC power, the turn-on times t1 and t2 associated with a corresponding switching period are determined. For example, when the output voltage of a predetermined switching period is "2", t1=51 and t2=49. Furthermore, the output voltage of a predetermined switching period is "−2", t1=49 and t2=51.

In other words, to provide the output voltage of a waveform equal to the commercial AC power, the sine waveform controller 505 maintains, during at least one commercial AC power period, the turn-on times t1 and t2 required for generating corresponding output voltage every time a predetermined switching period is shorter than a commercial AC power period.

The sine waveform controller 505 outputs, to the first and fourth switching devices SW1 and SW4, a sine wave generation control signal corresponding to the turn-on time t1, and outputs, to the second and third switching devices SW2 and SW3, a sine wave generation control signal corresponding to the turn-on time t2, in each switching period.

On the other hand, the D-class amplifier 503 can receive a DC voltage signal stored in the battery (not shown), and directly receive a DC voltage signal from the battery. Alternatively, the D-class amplifier 503 can receive a DC voltage signal boosted by the DC-DC converter 501 as shown in FIG. 5. A detailed description of the DC-DC converter 501 well known and disclosed in FIG. 1 of Korean Patent Publication No. 278699 will be omitted.

Since the DC-DC converter 501 uses a switching transformation method rather than a linear transformation method as in the conventional UPS, a volume and weight of the UPS can be considerably reduced when the sine wave generation circuit of the present invention is applied to the UPS.

Figure 6:
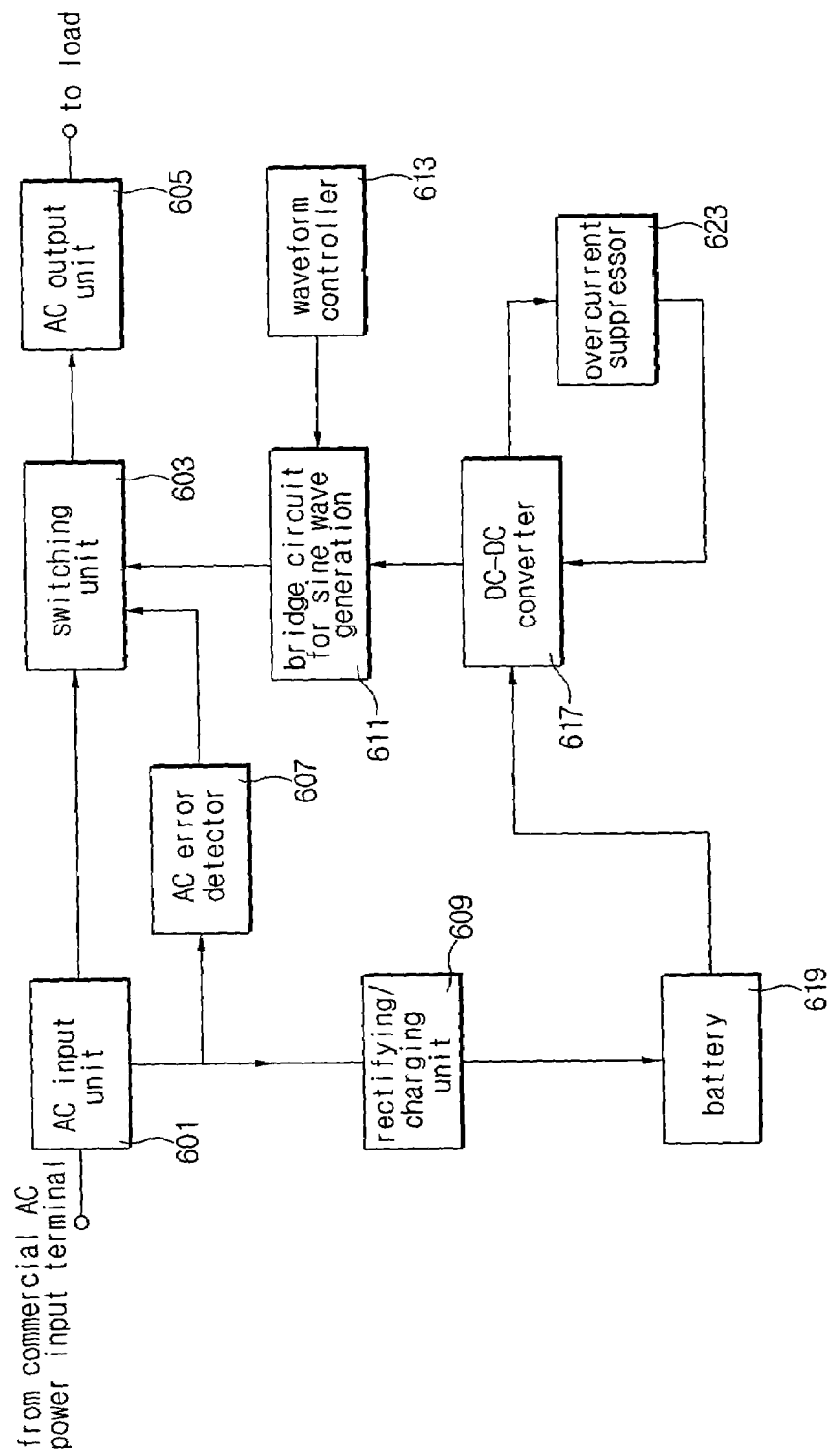
FIG. 6 is a block diagram illustrating an exemplary UPS equipped with the sine wave generation circuit.
Figure 7:
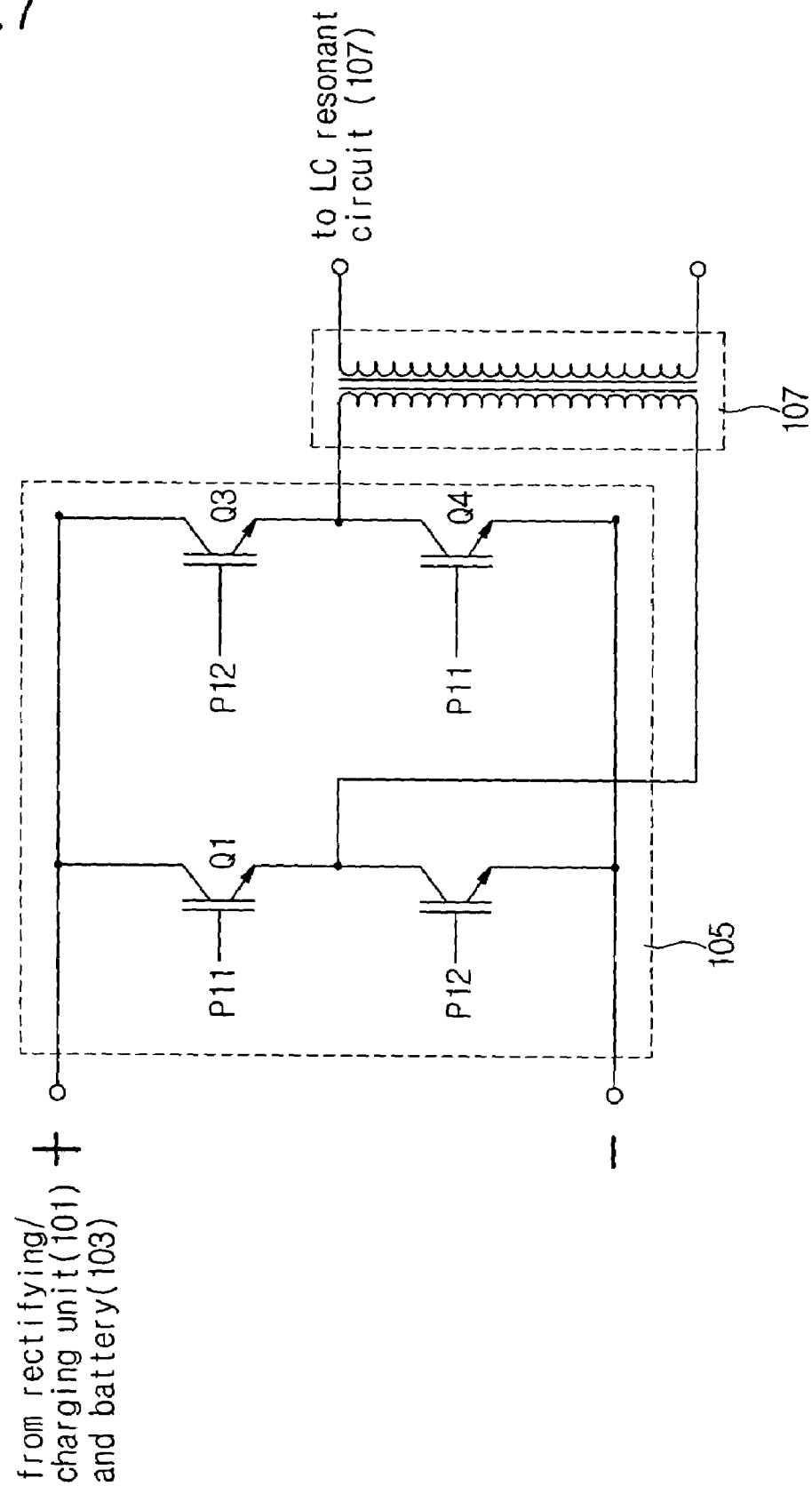
FIG. 7 is a circuit diagram illustrating an inverter and a linear transformer.

FIG. 6 is a block diagram illustrating an exemplary UPS equipped with the sine wave generation circuit for generating a sine wave and applying the generated sine wave to a load in accordance with the present invention. The UPS will be described with reference to FIG. 6 along with FIGS. 1 to 5.

System elements indicated by reference numerals 611, 613, 617 and 619 associated with the D-class amplifier of the present invention shown in FIG. 6 have been described above in detail. System elements indicated by reference numerals 601 to 609, 615, 621 and 623 configuring the UPS are well known. FIG. 6 exemplarily shows how to apply the D-class amplifier of the present invention to the UPS.

Figure 1:
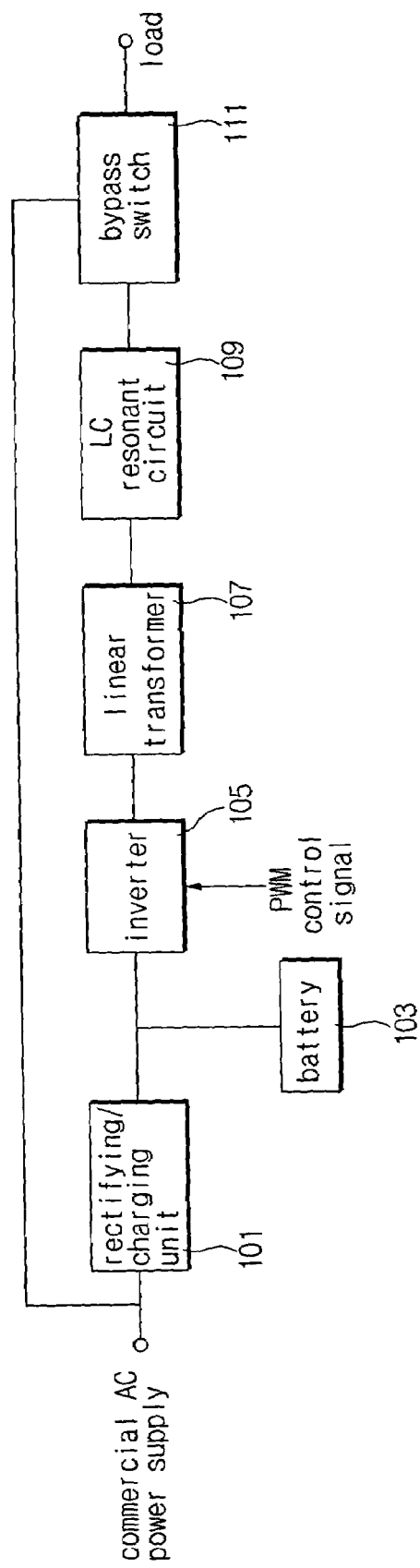
FIG. 1 is a view illustrating an exemplary conventional uninterruptible power supply system (UPS)

The UPS of the present invention is equipped with a D-class amplifier 611, a waveform controller 613 and a DC-DC converter 617 subsequent to a battery 619 without use of the linear transformer and the LC resonant circuit of the conventional UPS (shown in FIG. 1). The UPS of the present invention directly generates a true sine wave from DC power stored in the battery 619 through a switching method and applies the generated true sine wave to the load.

Thus, since the volume and weight of the UPS is small and light, the UPS can be appropriately implemented in a mobile electronic product. Furthermore, since the UPS can apply a correct sine wave to the load, a product associated with the UPS can be protected.

Operation of the UPS shown in FIG. 6 will now be described.

An AC input unit 601 connected to an input terminal of a commercial AC power supply receives AC power and then outputs the received AC power to a switching unit 603 and an auxiliary power supply (or rectifying/charging unit) 609. An AC error detector 607 detects an error of the commercial AC power received from the input unit 601. Upon detecting an error of the commercial AC power, the AC error detector 607 notifies the switching unit 603 of the error. The switching unit 603 applies the commercial AC power from the AC input unit 601 to the load through an AC output unit 605 in a normal mode. Furthermore, upon receiving an error detection signal from the AC error detector 607, the switching unit 603 performs a switching operation to output a sine waveform power signal from a D-class amplifier (or a bridge circuit for sine wave generation) 611 to the load through the AC output unit 605.

The rectifying unit 609 rectifies the commercial AC power from the AC input unit 601, converts the rectified power into DC power, and provides the DC power to the charging unit 609. The charging unit 609 charges a battery 619 with the DC power. A DC-DC converter 617 boosts and/or drops the DC power inputted from the battery 619 by a predetermined level of the commercial AC power and then inputs the boosted or dropped DC power into the D-class amplifier 611. At this time, an overcurrent suppressor 623 senses electric current generated from the DC-DC converter 617 and outputs a control signal so that overcurrent cannot occur.

As in the typical bridge circuit for power conversion, the D-class amplifier 611 includes a first inductance device L1 for high frequency pass arranged on the path (A-L2) between the second inductance device L2, arranged on a path for connecting the node A and the node B, and the node A; the third inductance device L3 for high frequency pass arranged on a path (L2-B) between the second inductance device L2 and the second node B; the first capacitance device C1 including one end thereof connected to the third node C arranged on a path (L1-L2) between the first inductance L1 and the second inductance device L2, and the other end thereof connected to the ground side; the second capacitance device C2 including one end thereof connected to the fourth node D arranged on a path (L2-L3) between the second inductance device L2 and the third inductance device L3 for high frequency pass and the other end thereof connected to the ground side; and the two output terminals X and Y connected to the first and second node (A and B) respectively.

In order for the output terminals X and Y to produce output voltage of a waveform equal to the commercial AC power, a sine waveform controller 613 performs a control operation so that a difference between a turn-on time t1 of one pair of the switching devices SW1 and SW4 provided in the bridge circuit 611 for sine wave generation and a turn-on time t2 of the other pair of the switching devices SW2 and SW3 provided in the bridge circuit 611 can be generated, and the output terminal X or Y can output voltage of the turn-on time difference every time a switching period is shorter than a commercial AC power period. The sine waveform controller 613 adjusts the turn-on time difference in each switching period, and performs a control operation so that the voltage outputted through the output terminal X or Y can be sine waveform voltage.

As apparent from the above description, the present invention enables a correct sine waveform to be directly generated through only a control operation for a D-class amplifier having a low-speed switching period and a cheap microcomputer without use of a high-speed analog/digital (A/D) converter, a switching device, a digital signal processor (DSP) and a digital/analog (D/A) converter, such that a sine wave generation circuit for directly generating a true sine wave from DC power stored in a battery through a switching method and applying the generated true sine wave to a load and an uninterruptible power supply system (UPS) using the same can be appropriately implemented. Further, as an electronic product and backup equipment using the commercial power can be miniaturized and lightened in weight, a mobile electronic product can be implemented. Furthermore, as the true sine wave (or correct sine waveform) can be directly generated through the switching method and the generated true sine wave can be applied to the load, a product can be appropriately protected.

In the UPS, the D-class amplifier can be easily applied to a circuit for converting the DC power stored in the battery into a waveform signal of the commercial AC power and applying the converted power to the load.

Since the present invention uses a switching transformation method without using a linear transformation method and an inductance and capacitance (LC) resonant circuit provided in the conventional UPS, the UPS can be miniaturized and lightened in weight where the sine wave generation circuit is applied to the UPS.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

What is claimed is:

1. An uninterruptible power supply system (UPS, comprising:
   arectifier for rectifying commercial alternating currant (AC) power from an input terminal and converting the AC power into direct current (DC) power;
   a charger for charging a battery with the DC power;
   the battery for providing the DC power;
   a DC-DC converter for boosting and/or dropping the DC power inputted from the battery by a predetermined level of the AC power;
   a D-class amplifier for receiving the DC power from the DC-DC converter and outputting a sine waveform power signal in response to a waveform control signal;
   a sine waveform controlling a sine waveform generation operation of the D-class amplifier; and
   a switching unit for switching the commercial AC power from the input terminal to a load in a normal mode, and switching the sine waveform power signal from the D-class amplifier to the load when an error of the commercial AC power is detected;
   wherein the D-class amplifier comprises a bridge circuit for power conversion, the bridge circuit comprising;
   a first inductance device (L1) for high-frequency pass arranged on a path (A-L2) between a second inductance device (L2), arranged on a path for connecting a first node (A) and a second node (B), and the first node (A);
   a third inductance device (L3) for high-frequency pass arranged on a path (L2-B) between the second inductance device (L2) and the second node (B);
   a first capacitance device (C1) including one end thereof connected to a third node (C) arranged on a path (L1-L2) between the first inductance device (L1) and the second inductance device (L2), and the other end thereof connected to a ground side;
   a second capacitance device (C2) including one end thereof connected to a fourth node (D) arranged on a path (L2-L3) between the second inductance device (L2) and the third inductance device (L3) and the other end thereof connected to the ground side; and
   two load output terminals (X and Y) connected to the first and second node (A and B) respectively,
   wherein the sine waveform controller performs a control operation so that a difference between a turn-on time of one pair of switching devices (SW1 and SW4) provided in the D-class amplifier and a turn-on time of the other pair of the switching devices (SW2 and SW3) provided in the D-class amplifier can be generated and an output terminal (X or Y) can output voltage of the turn-on time difference every time a predetermined switching period is shorter than a commercial AC power period, and
   wherein the sine waveform controller adjusts the turn-on time difference in each switching period, and performs a control operation so that the voltage outputted through the output terminal (X or Y) corresponds to sine waveform power equal to the commercial AC power.

2. A sine wave generation circuit for converting a waveform of direct current (DC) power stored in a battery into a waveform of commercial alternating current (AC) power and applying the commercial AC power, comprising;
   a bridge circuit for sine wave generation, the bridge circuit comprising;
   a first switching device (SW1) for receiving the DC power;
   a second switching device (SW2) for receiving the DC power;
   a fourth switching device (SW4) connected to the first switching device (SW1) through a path (A→B) between a first node (A) and a second node (B);
   a third switching device (SW3) connected to the second switching device (SW2) through a path (B→A) between the second node (B) and the first node (A);
   a second inductance device (L2) arranged in the path (A-B) between the first node (A) and the second node (B);
   a first inductance device (L1) for high-frequency pass arranged in a path (A-L2) between the first node (A) and the second inductance device (L2);
   a third inductance device (L3) for high-frequency pass arranged in a path (L2-B) between the second inductance device (L2) and the second node (B);
   a first capacitance device (C1) including one end thereof connected to a third node (C) arranged on a path (L1-L2) between the first inductance device (L1) and the second inductance device (L2), and the other end thereof connected to a ground side;
   a second capacitance device (C2) including one end thereof connected to a fourth node (D) arranged on a path (L2-L3) between the second inductance device (L2) and the third inductance device (L3) and the other end thereof connected to the ground side; and
   two load output terminals (X and Y) connected to the first and second node (A and B) respectively; and
   a sine waveform controller for applying a sine wave generation control signal to the switching devices (SW1~SW4), and performing a control operation so that one pair of the first and fourth switching devices (SW1 and SW4) and the other pair of the second and third switching devices (SW2 and SW3) can alternately perform a turn-on/turn-off operation, wherein the sine waveform controller performs a control operation so that a difference between a turn-on time of one pair of switching devices and a turn-on time of the other pair of switching devices can be generated and an output terminal (X or Y) can output voltage of the turn-on time difference every time a predetermined switching period is shorter than a commercial AC power period, and wherein the sine waveform controller adjusts the turn-on time difference in each switching period, and performs a control operation so that the voltage outputted through the output terminal (X or Y) corresponds to sine waveform power equal to the commercial AC power.

3. The sine wave generation circuit as set forth in claim 2, further comprising;

a DC-DC converter for boosting and/or dropping the DC power inputted from the battery by a predetermined level of the AC power and inputting the boosted or dropped DC power into the bridge circuit for sine wave generation.

* * * * *